United States Patent
Hu

(10) Patent No.: US 11,255,738 B2
(45) Date of Patent: Feb. 22, 2022

(54) ATTACHED RESISTANCE STRAIN SENSOR ASSEMBLY AND MOUNTING PROCESS THEREOF

(71) Applicant: Tianxu Hu, Zhejiang (CN)

(72) Inventor: Tianxu Hu, Zhejiang (CN)

( * ) Notice: Subject to any disclaimer, the term of this patent is extended or adjusted under 35 U.S.C. 154(b) by 59 days.

(21) Appl. No.: 16/862,520

(22) Filed: Apr. 29, 2020

(65) Prior Publication Data
US 2020/0363272 A1  Nov. 19, 2020

(30) Foreign Application Priority Data

May 15, 2019  (CN) .......................... 201910403186.8

(51) Int. Cl.
  *G01L 1/00*  (2006.01)
  *G01L 1/22*  (2006.01)

(52) U.S. Cl.
  CPC .......... *G01L 1/2287* (2013.01); *G01L 1/2262* (2013.01)

(58) Field of Classification Search
  CPC .............................. G01L 1/2287; G01L 1/2262
  See application file for complete search history.

(56) References Cited

U.S. PATENT DOCUMENTS

| | | | | | |
|---|---|---|---|---|---|
| 5,052,505 A | * | 10/1991 | Naito | ..................... | G01L 1/2287 177/229 |
| 5,112,246 A | * | 5/1992 | Kawase | ............... | H01R 13/641 439/489 |
| 7,360,439 B2 | * | 4/2008 | Kuroda | ................. | G01M 7/025 73/774 |
| 9,528,824 B2 | * | 12/2016 | Bos | ........................ | G01B 21/04 |
| 10,473,540 B2 | * | 11/2019 | Duvall | .................. | G01L 1/2218 |

FOREIGN PATENT DOCUMENTS

| | | |
|---|---|---|
| CN | 201795774 | 4/2011 |
| CN | 102269634 | 12/2011 |
| CN | 102269634 | 10/2012 |
| CN | 203414091 | 1/2014 |

OTHER PUBLICATIONS

"Office Action of China Counterpart Application", dated Sep. 1, 2020, p. 1-p. 6.

* cited by examiner

*Primary Examiner* — Max H Noori
(74) *Attorney, Agent, or Firm* — JCIP Global Inc.

(57) ABSTRACT

The invention discloses an attached resistance strain sensor assembly includes a sensor body, wherein substrates are respectively mounted at two ends of a lower end face of the sensor body, a heat insulation layer is provided between two of the substrates, the heat insulation layer covers the lower end face of the sensor body, an outer cover is covered above the sensor body, two ends of the outer cover are respectively mounted on the two substrates, and a wiring terminal is provided at one side of the outer cover. The sensor assembly can be mounted to a structural member by electric welding, so that the influence of high temperature on the performance of an elastic part in the sensor body during welding is reduced, the output value of the sensor is still in an expected range, and a more accurate load measurement value can be obtained.

7 Claims, 4 Drawing Sheets

ATTACHED RESISTANCE STRAIN SENSOR ASSEMBLY AND MOUNTING PROCESS THEREOF

CROSS-REFERENCE TO RELATED APPLICATION

This application claims the priority benefit of China application serial no. 201910403186.8, filed on May 15, 2019. The entirety of the above-mentioned patent application is hereby incorporated by reference herein and made a part of this specification.

BACKGROUND

Technical Field

The invention relates to a sensor, in particular to an attached resistance strain sensor assembly and a mounting process thereof.

Description of Related Art

Generally, the resistance strain sensor is classified and serialized according to the load value and can only be used for load measurement. When working, the sensor must be connected in series to the load chain to withstand a full load measured. Therefore, when the sensor is selected, the sensor with a large load is often required to be selected. Large load sensors tend to be larger in size. The on-site installation of the sensor is time-consuming, laborious and troublesome.

In order to solve the problem, the applicant filed an invention patent with the grant publication number CN102269634B in 2011, and the invention patent disclosed an attached resistance strain sensor, which comprises a base, an elastomer and a full-bridge type measuring bridge, wherein six elastic bridges are provided on the elastomer, the elastomer is divided into an upper section, a middle section and a lower section along a central axis, and the structure of each of the sections is a bilaterally symmetrical distribution; the shapes of the left part and the right part of the middle section are I-shaped respectively, a third elastic bridge is provided at a second stroke of the left I-shaped character, a fourth elastic bridge is provided at a second stroke of the right I-shaped character, and resistance strain foils of the full-bridge type measuring bridge are respectively arranged on two sides of the third elastic bridge and the fourth elastic bridge.

When a structure object deforms under load, the sensor attached to the surface of the structure object obtains an initial signal, and the signal obtains an electric signal output by a secondary meter and is used for measuring and monitoring load or deflection parameters. According to the detection method, under the condition of the same measuring point, a primary output value is improved by 20%-50%, and a sensor with relatively small bearing capacity can be selected.

The sensor can only be mounted on a structure measuring point of use equipment on site in two steps: firstly, welding notches at two sides of two substrates by using electric welding to weld the substrates on the structure, and mounting components such as a sensor, an outer cover and the like on the substrates after the temperature of the substrates is naturally cooled to room temperature.

The mounting has a long time and must take place while the equipment is down, often affecting production. In addition, due to the limitation of field conditions, it will influence the mounting quality and then the working reliability of the sensor.

The sensor based on the elastomer with the existing structural size cannot meet the requirements of large variation range of deformation values of a structure measuring point of field equipment and mounting size of the measuring point.

SUMMARY

For the defects of the prior art, the invention is directed to provide an attached resistance strain sensor assembly, so that a more accurate detection result can be obtained after the sensor is mounted on a structure object.

In order to achieve the above object, the invention provides the following technical scheme.

An attached resistance strain sensor assembly comprises a sensor body, wherein substrates are respectively mounted at two ends of a lower end face of the sensor body, a heat insulation layer is provided between two of the substrates, the heat insulation layer covers the lower end face of the sensor body, an outer cover is covered above the sensor body, two ends of the outer cover are respectively mounted on the two substrates, and a wiring terminal is provided at one side of the outer cover.

By adopting the technical scheme, step-by-step mounting is not required during the mounting, and the whole sensor assembly is mounted after the substrate is directly welded to the structure, with improved mounting efficiency. Meanwhile, since the sensor body, the outer cover and the like are all mounted in a factory and do not need to be mounted on site, the mounting quality of the sensor is improved, and the sensor has good working reliability. Because the sensor assembly bears a small partial load when working, the requirement of transmission deformation can be met only by a small welding spot. A heat insulation layer with good thermal insulation is provided between the sensor and the welding spot. Mounting the sensor assembly according to a specified welding process can ensure that the patch quality of the sensor patch area is not affected.

The invention is further provided that the sensor body comprises an elastomer and a full-bridge type measuring bridge, wherein six elastic bridges are provided on the elastomer, the elastomer is divided into an upper section, a middle section and a lower section along a central axis, the structure of each of the sections is a bilaterally symmetrical distribution, and the shapes of the left part and the right part of the middle section are I-shaped respectively; the left edge of the upper section is provided with a first elastic bridge connected with a starting position of a first stroke of an I-shaped character at the left part of the middle section, the right part of the upper section is provided with a second elastic bridge which is bilaterally symmetrical to the first elastic bridge, a second stroke of the I-shaped character at the left part of the middle section is provided as a third elastic bridge, the right part of the middle section is provided with a fourth elastic bridge which is bilaterally symmetrical to the third elastic bridge, the left part of the lower section is provided with a fifth elastic bridge which is longitudinally symmetrical to the first elastic bridge, and the right part of the lower section is provided with a sixth elastic bridge which is bilaterally symmetrical to the fifth elastic bridge; strain foils of the full-bridge type measuring bridge are respectively arranged on two sides of the third elastic bridge and the fourth elastic bridge; the connection between the two ends of each elastic bridge and the elastomer must adopt a circular arc transition.

The invention is further provided that the sensor body comprises an elastomer and a full-bridge type measuring bridge, wherein six elastic bridges are provided on the elastomer, the elastomer is divided into an upper section, a middle section and a lower section along a central axis, the structure of each of the sections is a bilaterally symmetrical distribution, and the shapes of the left part and the right part of the middle section are I-shaped respectively; the left part of the upper section is provided with a first elastic bridge connected with a ending position of a first stroke of an I-shaped character at the left part of the middle section along the central axis, the right part of the upper section is provided with a second elastic bridge which is bilaterally symmetrical to the first elastic bridge, a second stroke of the I-shaped character at the left part of the middle section is provided as a third elastic bridge, the right part of the middle section is provided with a fourth elastic bridge which is bilaterally symmetrical to the third elastic bridge, the left part of the lower section is provided with a fifth elastic bridge which is longitudinally symmetrical to the first elastic bridge, and the right part of the lower section is provided with a sixth elastic bridge which is bilaterally symmetrical to the fifth elastic bridge; strain foils of the full-bridge type measuring bridge are respectively arranged on two sides of the third elastic bridge and the fourth elastic bridge; the connection between the two ends of each elastic bridge and the elastomer must adopt a circular arc transition.

By adopting the technical scheme, the width dimension of the elastomer with a changed structure is effectively utilized. Therefore, it is possible to design a section patch area in the elastomer with larger primary output, so as to expand the range of the high output of the primary output value of the attached resistance strain sensor, providing conditions for classifying and serializing the deformation magnification ratio $\psi$ value of the sensor.

The invention is further provided that side positioning plates are fixedly connected to the side walls of the two sides of the substrates via bolts.

By adopting the technical scheme, it facilitates mounting and positioning of the sensor to guarantee good installation quality.

The invention is further provided that welding grooves are formed in two sides of the substrate.

By adopting the technical scheme, the welding spots can have larger contact area with the substrate, and the sensor assembly can be more stably welded on the structural member.

The invention is further provided that two welding grooves are formed in the side wall of one side of the substrate along the length direction of the sensor body.

By adopting the technical scheme, eight connecting points are arranged between the whole assembly and the structural member, so that the assembly can be more stably connected to the structural member.

The invention is further provided that the welding groove is semi-waist-shaped.

By adopting the technical scheme, the welding spots can have larger contact area with the substrate, and the sensor assembly can be more stably welded on the structural member.

The invention is further provided that the outer cover is fixedly connected to the substrates via bolts.

By adopting the technical scheme, the outer cover can be stably mounted on the substrate, and meanwhile, the outer cover can be conveniently disassembled, so that the sensor body in the outer cover can be more conveniently detected or maintained.

It is another object of the present invention to provide a mounting process for a sensor assembly.

In order to achieve the above object, the invention provides the following technical scheme.

A mounting process for the attached resistance strain sensor assembly according to claim 1 comprises the steps of:

S1, calculating a deformation value of a structure measuring point and a mounting size of the measuring point;

S2, according to a formula $\delta = C_2 \times E \times \varepsilon \times \psi \times L_0 \times V$, a deformation magnification ratio is $$\psi = \frac{\sum |\varepsilon''|}{\varepsilon'},$$

$\delta$ is a primary output signal value of a sensor assembly mounted on the equipment when the sensor assembly works, E is a material elastic modulus of a structure to which the sensor is attached, $L_0$ is a base length of the sensor assembly, V is a measuring bridge voltage, $C_2$ is a constant (test value), and $\varepsilon$ is a strain average value of a structure measuring point when the equipment works, $|\varepsilon''|$ is an output total value of the strain absolute value at the patch of the measuring bridge in the middle segment of the sensor when being calibrated on the calibrating device of the base length $L_0$=100 mm, and $\varepsilon'$ is a strain average value given when the sensor is calibrated on the calibrating device of the base length $L_0$=100 mm; an appropriate sensor assembly is selected so that the primary output signal value $\delta_m$ of the sensor assembly mounted on the equipment can reach 30-60 mV/10V when the equipment works under full load;

S3, welding the sensor assembly on the structure measuring point by adopting an electric welding process, wherein the welding point is located at the welding groove;

S4, disassembling the side positioning plate; and

S5, connecting the secondary meter by a wiring terminal.

By adopting the technical scheme, the sensors with corresponding $\psi$ values and the assembly base length $L_0$ are selected and matched according to different structure measuring point conditions and different technical requirements (such as the allowable mounting size range of the measuring points, the strain average value of the measuring points, the load detection precision and the like), so that the sensor assembly works under full load. When the equipment works under full load, the primary output signal $\delta_m$ value of a single sensor assembly can reach 30-60 mV/10V, which is 2-3 times the value output when detecting by adopting a common resistance strain type technology under the condition of the same load value, so that the system has high detection precision. The sensor assembly is installed by an electric welding process, so that the installation work is greatly simplified and can be carried out under the condition that the normal operation of equipment is not influenced no matter how large the detected load value is; the sensor assembly is attached to a measuring point on the surface of a component and only bears extremely small component force, so that the sensor assembly has good safety and dynamic working adaptability.

The invention has the following advantages: 1) the large load can be measured by a small-size sensor; 2) it can be used for monitoring parameters such as overload and underload limitation of a load, structural deflection, deformation and the like; 3) the sensor assembly is attached to a measuring point on the surface of the structure via a substrate and bears extremely small component force, the dynamic work is very safe, and a large load can be measured by a small-size sensor; meanwhile, it has good use safety and further improves the use reliability and the service life; 4) when it works under full load, the primary output signal $\delta_m$ value reaches 30-60 mV/10V, which is 2-3 times that of a general resistance strain type sensor under the same load condition; 5) the electric welding installation process based on the sensor assembly technology is established, so that the field installation work of the sensor assembly is greatly simplified, the matching among all parts of the sensor assembly and the installation quality of assembly such as sealing, moisture resistance, heat insulation and the like are improved, and the reliability and the service life of the sensor assembly are prolonged; 6) the assembling of the sensor assembly is carried out in a manufacturing factory instead of a use field, so that the matching requirements of all parts and the mounting quality of the assembly such as sealing, moisture resistance, heat insulation and the like are ensured, and the reliability and the service life of the sensor assembly are prolonged.

DESCRIPTION OF THE EMBODIMENTS

Example 1

Figure 1:
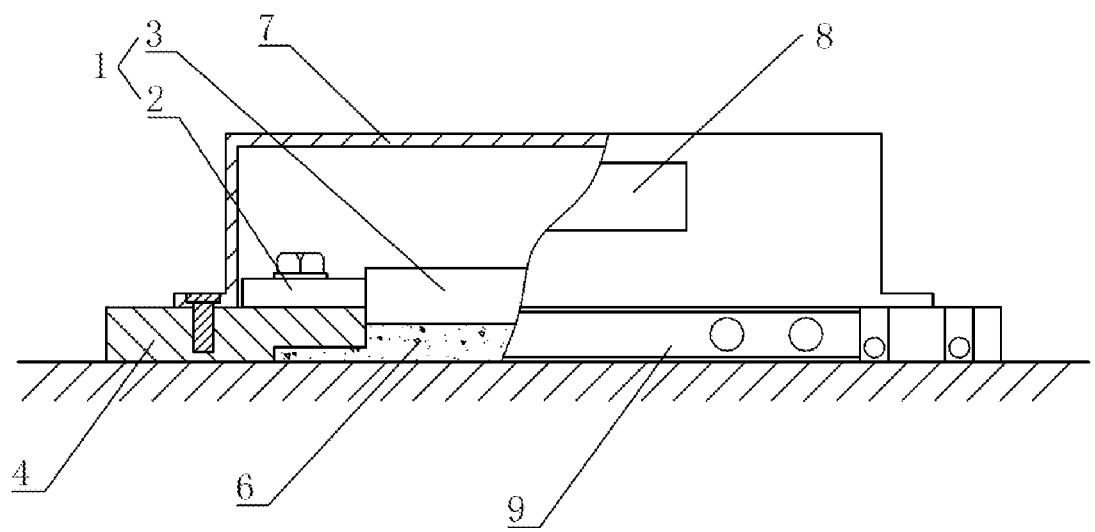
FIG. 1 is a structurally schematic view of Example 1.
Figure 2:
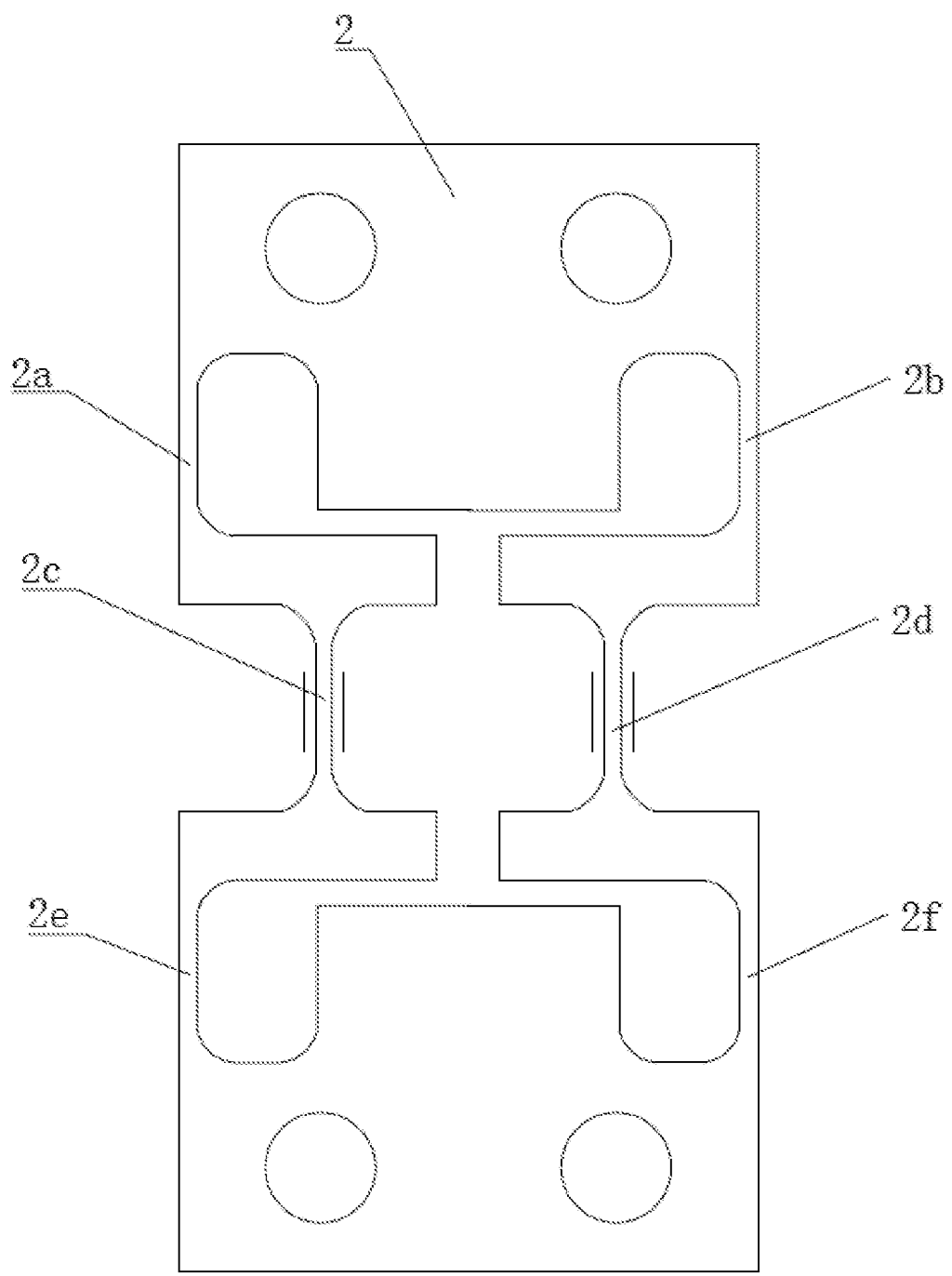
FIG. 2 is a structurally schematic view of an elastomer of Example 1.

As shown in FIGS. 1 and 2, an attached resistance strain sensor assembly comprises a sensor body 1. The sensor body 1 comprises an elastomer 2 and a full-bridge type measuring bridge 3. Six elastic bridges are provided on the elastomer 2, the elastomer 2 is divided into an upper section, a middle section and a lower section along a central axis, the structure of each of the sections is a bilaterally symmetrical distribution, and the shapes of the left part and the right part of the middle section are I-shaped respectively; the left edge of the upper section is provided with a first elastic bridge 2a connected with a starting position of a first stroke of an I-shaped character at the left part of the middle section, the right part of the upper section is provided with a second elastic bridge 2b which is symmetrical to the first elastic bridge 2a, a second stroke of the I-shaped character at the left part of the middle section is provided as a third elastic bridge 2c, the right part of the middle section is provided with a fourth elastic bridge 2d which is symmetrical to the third elastic bridge 2c, the left part of the lower section is provided with a fifth elastic bridge 2e which is longitudinally symmetrical to the first elastic bridge 2a, and the right part of the lower section is provided with a sixth elastic bridge 2f which is symmetrical to the fifth elastic bridge 2e; strain foils of the full-bridge type measuring bridge are respectively arranged on two sides of the third elastic bridge 2c and the fourth elastic bridge 2d; the connection between the two ends of each elastic bridge and the elastomer 2 must adopt a circular arc transition.

Figure 3:
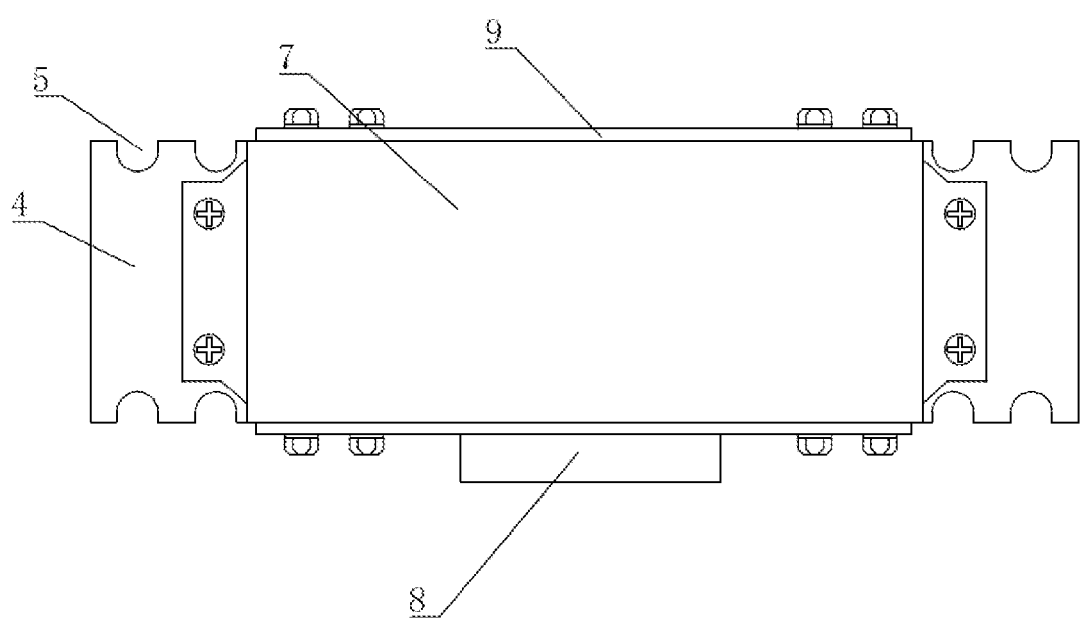
FIG. 3 is a top view of Example 1.

As shown in FIGS. 1 and 3, the substrates 4 are fixedly installed at two ends of the lower end face of the elastomer 2. Two welding grooves 5 are formed in the side walls of the two sides of the substrate 4 along the length direction of the sensor body 1. The welding groove 5 is semi-waist-shaped. A heat insulation layer 6 is provided between the two substrates 4, and the heat insulation layer 6 covers the lower end face of the sensor body 1. An outer cover 7 is covered above the sensor body 1, two ends of the outer cover 7 are respectively mounted on the two substrates 4, and the outer cover 7 is fixedly connected to the substrates 4 via bolts. One side of the outer cover 7 is provided with a wiring terminal 8.

Each sensor has a corresponding deformation amplification ratio $\psi$, $$\psi = \frac{\sum |\varepsilon''|}{\varepsilon'},$$

$|\varepsilon''|$, is the total output value of the strain absolute value at the patch of the measuring bridge in the middle segment of the sensor when the sensor is calibrated on a calibration device at the base length of $L_0=100$ mm, and $\varepsilon'$ is the strain average value given when the sensor is calibrated on the calibration device at the base length of $L_0=100$ mm. $\psi$ is related to the structural dimensions of the first elastic bridge 2a, the second elastic bridge 2b, the third elastic bridge 2c, the fourth elastic bridge 2d, the fifth elastic bridge 2e and the sixth elastic bridge 2f. Sensor bodies with different $\psi$ can be obtained by different designs. At present, the attached resistance strain sensors with the two different elastomer structures have been serialized by 8 steps according to the deformation magnification ratios thereof, and the values of $\psi$ are 6.0-23.0 respectively.

The assembly mounting process is as follows:

S1, calculating a deformation value of a structure measuring point and a mounting size of the measuring point;

S2, according to a formula $\delta=C_2 \times E \times \varepsilon \times \psi \times L_0 \times V$, a deformation magnification ratio is $$\psi = \frac{\sum |\varepsilon''|}{\varepsilon'},$$

$\delta$ is a primary output signal value of a sensor assembly mounted on the equipment when the sensor assembly works, E is a material elastic modulus of a structure to which the sensor is attached, $L_0$ is a base length of the sensor assembly, V is a measuring bridge voltage, $C_2$ is a constant (test value), and $\varepsilon$ is a strain average value of a structure measuring point when the equipment works; an appropriate sensor body is selected so that the primary output signal value $\delta_m$ of the sensor assembly mounted on the equipment can reach 30-60 mV/10V when the equipment works under full load;

S3, welding the sensor assembly on the structure measuring point by adopting an electric welding process, wherein the welding point is located at the welding groove 5;

S4, disassembling the side positioning plate; and
S5, connecting the secondary instrument by a wiring terminal 8.

The base length $L_0$ of the sensor assembly is well matched with the deformation amplification ratio $\psi$ thereof, so that the optimal primary high output when the sensor assembly is fully loaded can be obtained. Many years of practical application of the technology in different industrial fields proves that the primary output value $\delta_m$ of the sensor used on site ranges from 30 to 60 mV when the sensor is fully loaded. It is 2-3 times of the primary output value of the traditional weighing sensor.

Example 2

Figure 4:
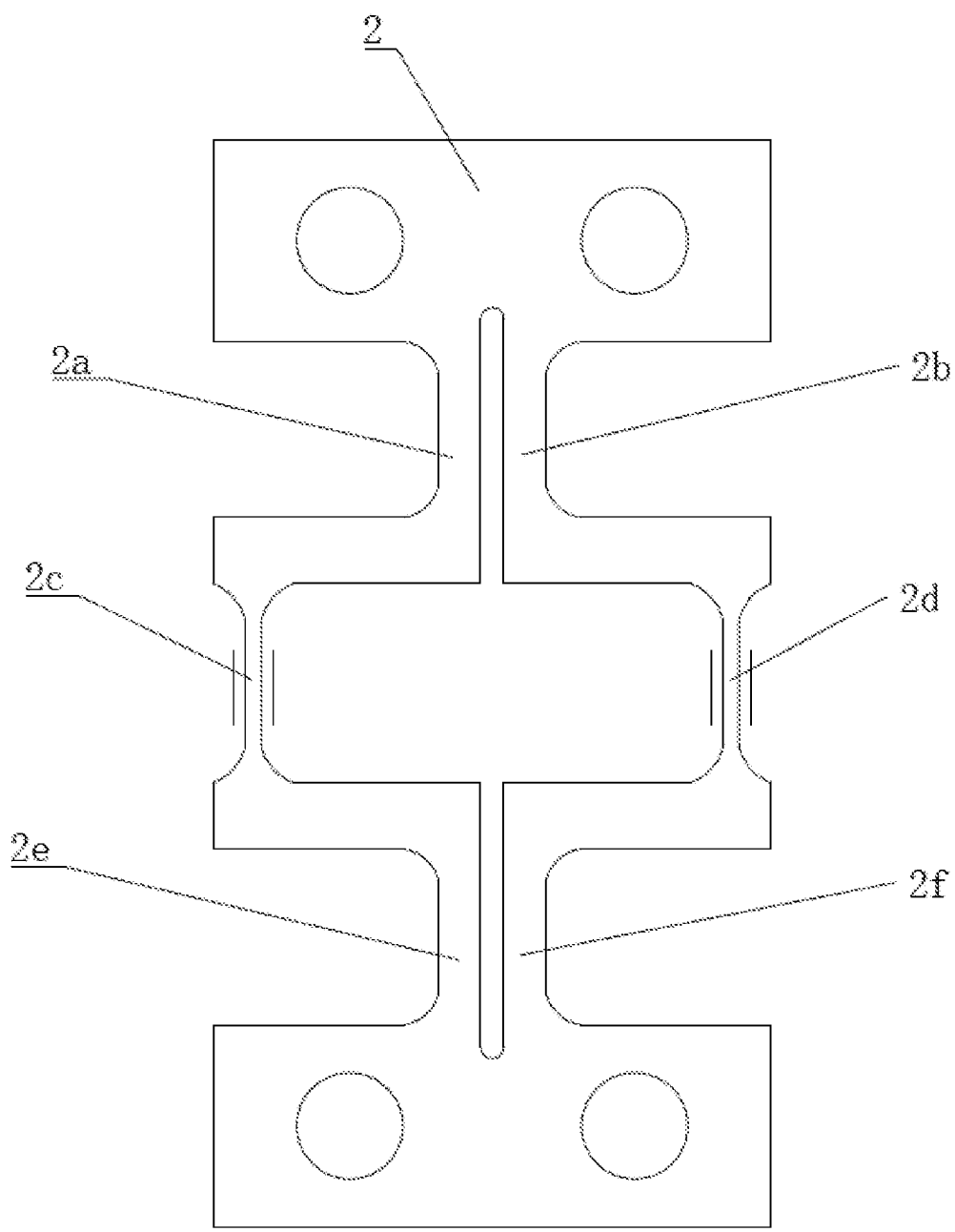
FIG. 4 is a structurally schematic view of the elastomer in Example 2.

Example 2 differs from Example 1 in that the elastomer 2 is different as shown in FIG. 4. Six elastic bridges are provided on the elastomer 2, the elastomer is divided into an upper section, a middle section and a lower section along a central axis, the structure of each of the sections is a bilaterally symmetrical distribution, and the shapes of the left part and the right part of the middle section are I-shaped respectively; the left part of the upper section is provided with a first elastic bridge 2a connected with a ending position of a first stroke of an I-shaped character at the left part of the middle section along the central axis, the right part of the upper section is provided with a second elastic bridge 2b which is bilaterally symmetrical to the first elastic bridge 2a, a second stroke of the I-shaped character at the left part of the middle section is provided as a third elastic bridge 2c, the right part of the middle section is provided with a fourth elastic bridge 2d which is bilaterally symmetrical to the third elastic bridge 2c, the left part of the lower section is provided with a fifth elastic bridge 2e which is longitudinally symmetrical to the first elastic bridge 2a, and the right part of the lower section is provided with a sixth elastic bridge 2f which is bilaterally symmetrical to the fifth elastic bridge 2e; strain foils of the full-bridge type measuring bridge 3 are respectively arranged on two sides of the third elastic bridge 2c and the fourth elastic bridge 2d; the connection between the two ends of each elastic bridge and the elastomer 2 must adopt a circular arc transition.

Example 3

An attached resistance strain sensor is used for a 35t bridge crane of Shagang to carry out overload limitation and real-time process metering. With a FWZ-C-35t type instrument, sensors are installed in the middle of the upper surfaces of slot holes of the supporting plate at the two ends of the fixed pulley shaft. $\psi=23$, $L_0=50$ mm, $Q_m=36.1$t, $\delta_m=2\times27.5$ mV/10V.

Example 4

An attached resistance strain sensor is used for monitoring the deflection of the section of a girder of a 360-ton bridge crane. With a FWZ-C-360t type instrument, sensors are installed in the middle of the upper surfaces of the fixed pulley beam. $\psi=7.5$, $L_0=150$ mm, $\Delta m=13$ mm, $\delta_m=2\times31.5$ mV/10V.

Example 5

An attached resistance strain sensor is used for a 2×1000t fixed gate hoist of the Altash hydropower station in Xinjiang to carry out overload and underload limitation. With a FWZ-C-1000t type instrument, sensors are installed in the middle of the upper surfaces of the two outer side bracket slots of the fixed pulley. $\psi=9$, $L_0=100$ mm, $Q_m=1030$t, $\delta_m=46.2$ mV/10V, $Q_s\leq30$t.

Example 6

An attached resistance strain sensor is used for a bridge crane of the Xiangjiaba hydropower station to carry out overload limitation and section strength monitoring of a fixed pulley beam. With a FWZ-C-800(200)t type instrument, sensors are installed in the middle of the upper surfaces of the fixed pulley beam. $\psi=6$, $L_0=200$ mm, $Q_m=824.0$t, $\delta_m=2\times30$ mV/10V, $\sigma_m=91.7$ MP.

Example 7

An attached resistance strain sensor is used for a 100t bridge crane of the kquswagah thermal power station in the Philippine to carry out overload limitation. With a FWZ-C-100t instrument, sensors are installed in the middle of the upper surface of the fixed pulley beam.

$$\psi=19, L_0=150 \text{ mm}, Q_m=103.0t, \delta_m=43.0 mV/10V.$$

Annotations: $\psi$—a deformation amplification ratio of the sensor body; $L_0$—a base length of the sensor assembly; $\delta_m$—a primary output signal value output by the sensor assembly when the equipment works under full load (the voltage of the bridge is 10V); $Q_m$—a full load value that the equipment bears; $Q_s$—an underload value of the equipment; $\Delta m$—a deflection of the girder when the equipment works under full load; $\sigma_m$—a surface stress value of the section surface of the fixed pulley beam when the equipment is fully loaded.

The above-mentioned embodiments are merely preferred embodiments of the present invention, and the scope of the present invention is not limited to the above-mentioned embodiments, and all technical solutions belonging to the spirit of the present invention fall within the scope of the present invention. It should be noted that those skilled in the art will appreciate that various modifications and adaptations can be made without departing from the principles of the invention and fall in the scope of the present invention.

What is claimed is:

1. An attached resistance strain sensor assembly, comprising a sensor body, wherein substrates are respectively mounted at two ends of a lower end face of the sensor body, a heat insulation layer is provided between two of the substrates, the heat insulation layer covers the lower end face of the sensor body, an outer cover is covered above the sensor body, two ends of the outer cover are respectively mounted on two of the substrates, and a wiring terminal is provided at one side of the outer cover;

wherein welding grooves are formed in two sides of the substrates, and two of the welding grooves are formed in the side wall of one side of the substrates along a length direction of the sensor body.

2. The attached resistance strain sensor assembly according to claim 1, wherein the sensor body comprises an elastomer and a full-bridge type measuring bridge, wherein six elastic bridges are provided on the elastomer, the elastomer is divided into an upper section, a middle section and a lower section along a central axis, a structure of each of the upper section, the middle section and the lower section is a bilaterally symmetrical distribution, and shapes of a left part and a right part of the middle section are I-shaped respectively; the left edge of the upper section is provided with a first elastic bridge connected with a starting position of a first stroke of an I-shaped character at the left part of the middle section, the right part of the upper section is provided with a second elastic bridge which is bilaterally symmetrical to the first elastic bridge, a second stroke of the I-shaped character at the left part of the middle section is provided as a third elastic bridge, the right part of the middle section is provided with a fourth elastic bridge which is bilaterally symmetrical to the third elastic bridge, the left part of the lower section is provided with a fifth elastic bridge which is longitudinally symmetrical to the first elastic bridge, and the right part of the lower section is provided with a sixth elastic bridge which is bilaterally symmetrical to the fifth elastic bridge; strain foils of the full-bridge type measuring bridge are respectively arranged on two sides of the third elastic bridge and the fourth elastic bridge; a connection between the two ends of each elastic bridge and the elastomer must adopt a circular arc transition.

3. The attached resistance strain sensor assembly according to claim 1, wherein one of the welding grooves is semi-waist-shaped.

4. The attached resistance strain sensor assembly according to claim 1, wherein the sensor body comprises an elastomer and a full-bridge type measuring bridge, wherein six elastic bridges are provided on the elastomer, the elastomer is divided into an upper section, a middle section and a lower section along a central axis, a structure of each of the sections is a bilaterally symmetrical distribution, and shapes of a left part and a right part of the middle section are I-shaped respectively; the left part of the upper section is provided with a first elastic bridge connected with an ending position of a first stroke of an I-shaped character at the left part of the middle section along the central axis, the right part of the upper section is provided with a second elastic bridge which is bilaterally symmetrical to the first elastic bridge, a second stroke of the I-shaped character at the left part of the middle section is provided as a third elastic bridge, the right part of the middle section is provided with a fourth elastic bridge which is bilaterally symmetrical to the third elastic bridge, the left part of the lower section is provided with a fifth elastic bridge which is longitudinally symmetrical to the first elastic bridge, the right part of the lower section is provided with a sixth elastic bridge which is bilaterally symmetrical to the fifth elastic bridge; strain foils of the full-bridge type measuring bridge are respectively arranged on two sides of the third elastic bridge and the fourth elastic bridge; a connection between the two ends of each elastic bridge and the elastomer must adopt a circular arc transition.

5. The attached resistance strain sensor assembly according to claim 1, wherein side positioning plates are fixedly connected to side walls of two sides of the substrates via bolts.

6. The attached resistance strain sensor assembly according to claim 1, wherein the outer cover is fixedly connected to the substrates via bolts.

7. A mounting process for the attached resistance strain sensor assembly according to claim 1, wherein by comprising steps of:

S1, calculating a deformation value of a structure measuring point and a mounting size of the measuring point;

S2, according to a formula $\delta = C_2 \times E \times \varepsilon \times \psi \times L_0 \times V$, a deformation magnification ratio is $$\psi = \frac{\sum |\varepsilon''|}{\varepsilon'},$$

$\delta$ is a primary output signal value of a sensor assembly mounted on an equipment when the sensor assembly works, E is a material elastic modulus of a structure to which the sensor is attached, $L_0$ is a base length of the sensor assembly, V is a measuring bridge voltage, $C_2$ is a constant (test value), and $\varepsilon$ is a strain average value of a structure measuring point when an equipment works, $|\varepsilon''|$ is an output total value of a strain absolute value at a patch of a measuring bridge in a middle segment of the sensor when being calibrated on a calibrating device of a base length $L_0$=100 mm, and $\varepsilon'$ is a strain average value given when the sensor is calibrated on the calibrating device of the base length $L_0$=100 mm; an appropriate sensor assembly is selected so that a primary output signal value $\delta_m$ of the sensor assembly mounted on the equipment can reach 30-60 mV/10V when the equipment works under full load;

S3, welding the sensor assembly on the structure measuring point by adopting an electric welding process, wherein a welding point is located at one of the welding grooves;

S4, disassembling a side positioning plate; and

S5, connecting a secondary meter by the wiring terminal.

* * * * *